United States Patent
Hannuksela et al.

(10) Patent No.: US 11,553,258 B2
(45) Date of Patent: Jan. 10, 2023

(54) APPARATUS, A METHOD AND A COMPUTER PROGRAM FOR VIDEO CODING AND DECODING

(71) Applicant: Nokia Technologies Oy, Espoo (FI)

(72) Inventors: Miska Hannuksela, Tampere (FI); Emre Aksu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/973,655

(22) PCT Filed: Jul. 9, 2019

(86) PCT No.: PCT/FI2019/050536
§ 371 (c)(1),
(2) Date: Dec. 9, 2020

(87) PCT Pub. No.: WO2020/012070
PCT Pub. Date: Jan. 16, 2020

(65) Prior Publication Data
US 2021/0258659 A1  Aug. 19, 2021

(30) Foreign Application Priority Data

Jul. 10, 2018  (FI) .................................... 20185635

(51) Int. Cl.
*H04N 21/854* (2011.01)
*H04N 21/8543* (2011.01)
*H04N 19/70* (2014.01)

(52) U.S. Cl.
CPC ....... *H04N 21/85406* (2013.01); *H04N 19/70* (2014.11); *H04N 21/8543* (2013.01)

(58) Field of Classification Search
CPC ......... H04N 21/85406; H04N 21/8543; H04N 19/70
See application file for complete search history.

(56) References Cited

U.S. PATENT DOCUMENTS 6,888,569 B2    5/2005  Fox et al.
9,229,748 B2 *  1/2016  Larimore ............ G06F 9/45558
(Continued)

OTHER PUBLICATIONS

"Information Technology—Coding Of Audio-Visual Objects—Part 12: ISO Base Media File Format", ISO/IEC 14496-12, Fifth edition, Dec. 15, 2015, 248 pages.
(Continued)

*Primary Examiner* — Jefferey F Harold
*Assistant Examiner* — Franklin S Andramuno
(74) *Attorney, Agent, or Firm* — Harrington & Smith

(57) ABSTRACT

A method comprising: authoring a first section of a first media format, wherein the first section comprises type and length fields of the first section, wherein the type value of the first section of the first media format is such that allows parsers of the first media format ignore the first section; one or more entire sections complying with a second media format; and a section header of a bridge section complying with the second media format, wherein the section header comprises type and length fields; authoring a second section of the first media format, comprising type and length fields of the second section; and data complying with the second media format; and setting the content of the first section to be such that it allows parsers of the second media format ignore the type and length fields of the second section.

16 Claims, 6 Drawing Sheets

---

Author a first section of a first media format, wherein the first section comprises type and length fields of the first section, wherein the type value of the first section of the first media format is such that allows parsers of the first media format ignore the first section; one or more entire sections complying with a second media format; and a section header of a bridge section complying with the second media format, wherein the section header comprises type and length fields (500)

Author a second section of the first media format, comprising type and length fields of the second section; and data complying with the second media format (502)

Set the content of the first section to be such that it allows parsers of the second media format ignore the type and length fields of the second section (504)

(56) References Cited

U.S. PATENT DOCUMENTS

| | | | |
|---|---|---|---|
| 9,338,467 B1* | 5/2016 | Gadepalli | H04N 19/436 |
| 2004/0047615 A1 | 3/2004 | Itoh | |
| 2006/0050785 A1 | 3/2006 | Watanabe et al. | |
| 2007/0268865 A1* | 11/2007 | Garcia | H04W 36/0011 370/331 |
| 2011/0103696 A1 | 5/2011 | Mizuno | |
| 2017/0279867 A1* | 9/2017 | Morton | G06Q 10/10 |
| 2019/0279684 A1* | 9/2019 | Kobayashi | G11B 27/3081 |
| 2019/0340832 A1* | 11/2019 | Srinivasan | G06T 19/006 |

OTHER PUBLICATIONS

"Information Technology—Coding Of Audio-Visual Objects—Part 14: MP4 File Format", ISO/IEC 14496-14, First edition, Nov. 15, 2003, 18 pages.

"Information Technology—Coding Of Audio-Visual Objects—Part 15: Advanced Video Coding (AVC) File Format", ISO/IEC 14496-15, First edition, Apr. 15, 2004, 29 pages.

"Information technology—High efficiency coding and media delivery in heterogeneous environments—Part 12: Image File Format", ISO/IEC 23008-12, First Edition, Dec. 2017, 82 pages.

"3rd Generation Partnership Project; Technical Specification Group Services and System Aspects; Transparent end-to-end packet switched streaming service (PSS); 3GPP file format (3GP) (Release 14)", 3GPP TS 26.244, V14.1.0, Dec. 2017, pp. 1-67.

"Resource Interchange File Format", Wikipedia, Retrieved on Nov. 26, 2020, Webpage available at : https://en.wikipedia.org/wiki/Resource_Interchange_File_Format.

"JPEG", Wikipedia, Retrieved on Nov. 26, 2020, Webpage available at : https://en.wikipedia.org/wiki/JPEG.

"Exchangeable image file format for digital still cameras: Exif Version 2.2", Standard of Japan Electronics and Information Technology Industries Association, JEITA CP-3451, Apr. 2002, 154 pages.

"Information Technology—MPEG Systems Technologies—Part 14: Partial file format", ISO/IEC 23001-14, First Edition, Jan. 2019, 10 pages.

"Information Technology—Generic coding of Moving Pictures and Associated Audio Information: Systems", Series H: Audiovisual and Multimedia Systems, Infrastructure of Audiovisual Services—Transmission Multiplexing and Synchronization, ITU-T H.222.0, Mar. 2017, 291 pages.

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.

Bross et al., "Versatile Video Coding Editorial Refinements on Draft 10", Joint Video Experts Team (JVET) of ITU-T SG 16 WP 3 and ISO/IEC JTC 1/SC 29, JVET-T2001-v1, Oct. 7-16, 2020, pp. 1-511.

"Terminal Equipment and Protocols for Telematic Services", Information Technology—Digital Compression and Coding of Continuous-Tone Still Images—Requirements and Guidelines, CCITT T.81, Sep. 1992, 186 pages.

Office action received for corresponding Finnish Patent Application No. 20185635, dated Feb. 20, 2019, 9 pages.

"Image Technology Colour Management—Architecture, Profile Format, and Data Structure", International Color Consortium, Specification ICC.1 :2010, Profile version 4.3.0.0, 2010, 130 pages.

"The Metadata in JPEG files", Exiv2, Retrieved on Nov. 27, 2020 2008, Webpage available at : http://dev.exiv2.org/projects/exiv2/wiki/The_Metadata_in_JPEG_files.

International Search Report and Written Opinion received for corresponding Patent Cooperation Treaty Application No. PCT/FI2019/050536, dated Oct. 18, 2019, 16 pages.

Miska M. Hannuksela and Emre B. Aksu "[HEIF] Embedding ISOBMFF-Structured File into JPEG File" International Organisation for Standardisation Organisation Internationale De Normalisation ISO/IEC JTC1/SC29/WG11 Coding of Moving Pictures and Audio. Jul. 2018.

\* cited by examiner

Author a first section of a first media format, wherein the first section comprises type and length fields of the first section, wherein the type value of the first section of the first media format is such that allows parsers of the first media format ignore the first section; one or more entire sections complying with a second media format; and a section header of a bridge section complying with the second media format, wherein the section header comprises type and length fields (500)

Author a second section of the first media format, comprising type and length fields of the second section; and data complying with the second media format (502)

Set the content of the first section to be such that it allows parsers of the second media format ignore the type and length fields of the second section (504)

Fig. 5

Receive an offset in association with the media file, the offset indicating a start position within the media file complying with a second media format (600)

Parse the media file starting from the offset using a parsing process of the second media format (602)

Fig. 6

APPARATUS, A METHOD AND A COMPUTER PROGRAM FOR VIDEO CODING AND DECODING

RELATED APPLICATION

This application claims priority to PCT Application No. PCT/FI2019/050536, filed on Jul. 9, 2019, which claims priority to Finnish Application No. 20185635, filed on Jul. 10, 2018, each of which is incorporated herein by reference in its entirety.

TECHNICAL FIELD

The present invention relates to an apparatus, a method and a computer program for video coding and decoding.

BACKGROUND

The syntax of many media file formats is based on a hierarchical list of type and length prefixed data chunks or boxes, where the naming depends on the format in question. In a container file according to ISO base media file format (ISOBMFF; ISO/IEC 14496-12), the media data and metadata is arranged in various types of boxes. Many formats are derived from ISOBMFF, including the High Efficiency Image File Format (HEIF, ISO/IEC 23008-12), MPEG-4 file format (ISO/IEC 14496-14, also known as the MP4 format), file format for NAL unit structured video (ISO/IEC 14496-15) and 3GPP file format (3GPP TS 26.244, also known as the 3GP format). These formats use the same box-structured basic structure.

On the other hand, Resource Interchange File Format (RIFF) files consist of chunks, whereas a JPEG file consists of a sequence of segments.

While many media formats use a file structure that is based on a sequence of sections that are type and length prefixed, they differ in details, such as the number of bytes for the type and length fields and the endianness of fields. Thus, file formats of different basic structure or definitions cannot be made conforming to each other. For example, a JPEG file cannot be made compliant with HEIF by just defining marker values and box types from the same value space.

SUMMARY

Now in order to at least alleviate the above problems, an enhanced file authoring method is introduced herein.

A method according to a first aspect comprises authoring a first section of a first media format, wherein the first section comprises type and length fields of the first section, wherein the type value of the first section of the first media format is such that allows parsers of the first media format ignore the first section; one or more entire sections complying with a second media format; and a section header of a bridge section complying with the second media format, wherein the section header comprises type and length fields; authoring a second section of the first media format, comprising type and length fields of the second section; and data complying with the second media format; and setting the content of the first section to be such that it allows parsers of the second media format ignore the type and length fields of the second section.

According to an embodiment, said setting of the content of the first section further comprises setting the type value of the section header is such that allows parsers of the second media format ignore the bridge section; and setting the value of the length field of the section header of the bridge section to be such that the type and length fields of the second section of the first media format are enclosed in the bridge section.

According to an embodiment, the first media format is JPEG and the second media format is HEIF, the first section is a JPEG marker segment and the bridge section is a bridge box having a type allowing HEIF parsers ignore the bridge box.

According to an embodiment, said setting of the content of the first section further comprises indicating in the type field of the bridge section that the bridge section contains media data; indicating in the length field of the bridge section that the bridge section encloses the type and length fields of the second section and at least a subset of the data complying with the second media format; and including only such data references in the one or more entire sections that avoid referencing the type and length fields of the second section.

According to an embodiment, the method further comprises indicating, in a media file, a data reference to a media frame according to the second media format to be one of the following: a first byte offset relative to a start position within the media file of the one or more entire sections complying with the second media format; a second byte offset relative to a resource identified by a URL, the URL identifying the media file; a third byte offset relative to the start of the media file; or a fourth byte offset relative to an identified media data container with an indicated first identifier value.

According to an embodiment, the method further comprises deriving an offset indicating a start position within the media file of the one or more entire sections complying with the second media format; and indicating the offset in association with the media file.

An apparatus according to a second aspect comprises means for authoring a first section of a first media format, wherein the first section comprises type and length fields of the first section, wherein the type value of the first section of the first media format is such that allows parsers of the first media format ignore the first section; one or more entire sections complying with a second media format; and a section header of a bridge section complying with the second media format, wherein the section header comprises type and length fields; means for authoring a second section of the first media format, comprising type and length fields of the second section; and data complying with the second media format; and means for setting the content of the first section to be such that it allows parsers of the second media format ignore the type and length fields of the second section.

A method according to a third aspect comprises receiving an offset in association with the media file, the offset indicating a start position within the media file complying with a second media format; and parsing the media file starting from the offset using a parsing process of the second media format.

An apparatus according to a fourth aspect comprises means for receiving an offset in association with the media file, the offset indicating a start position within the media file complying with a second media format; and means for parsing the media file starting from the offset using a parsing process of the second media format.

The further aspects relate to apparatuses and computer readable storage media stored with code thereon, which are arranged to carry out the above methods and one or more of the embodiments related thereto.

BRIEF DESCRIPTION OF THE DRAWINGS

For better understanding of the present invention, reference will now be made by way of example to the accompanying drawings in which:

FIG. 5 shows a flow chart of a file authoring method according to an embodiment of the invention;

FIG. 6 shows a flow chart of a file parsing method according to an embodiment of the invention;

DETAILED DESCRIPTION OF SOME EXAMPLE EMBODIMENTS

Figure 1:
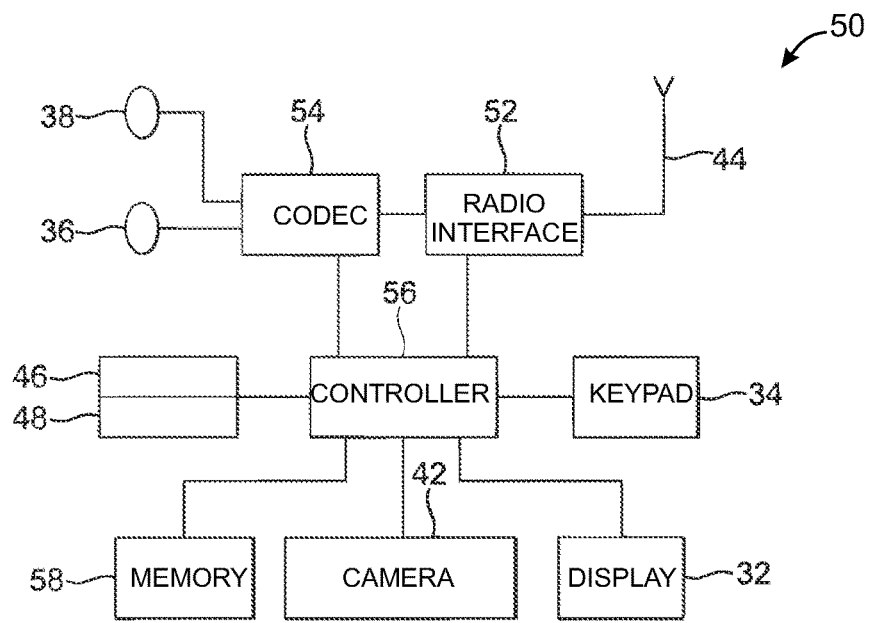
FIG. 1 shows schematically an electronic device employing embodiments of the invention.
Figure 2:
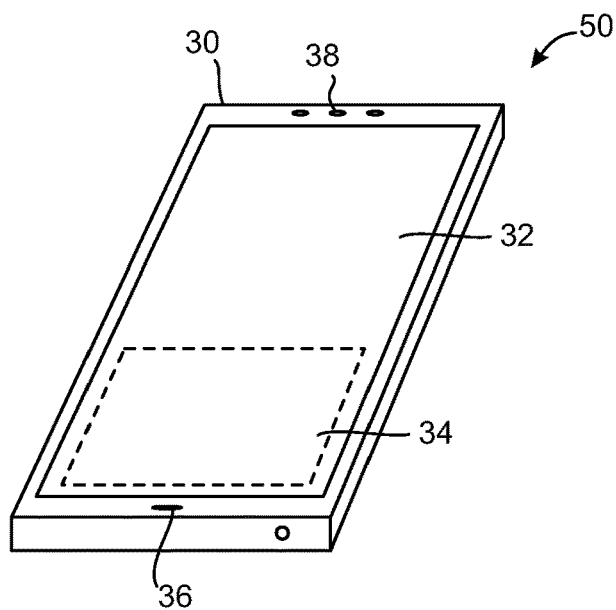
FIG. 2 shows schematically a user equipment suitable for employing embodiments of the invention.

The following describes in further detail suitable apparatus and possible mechanisms for implementing the embodiments described below. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
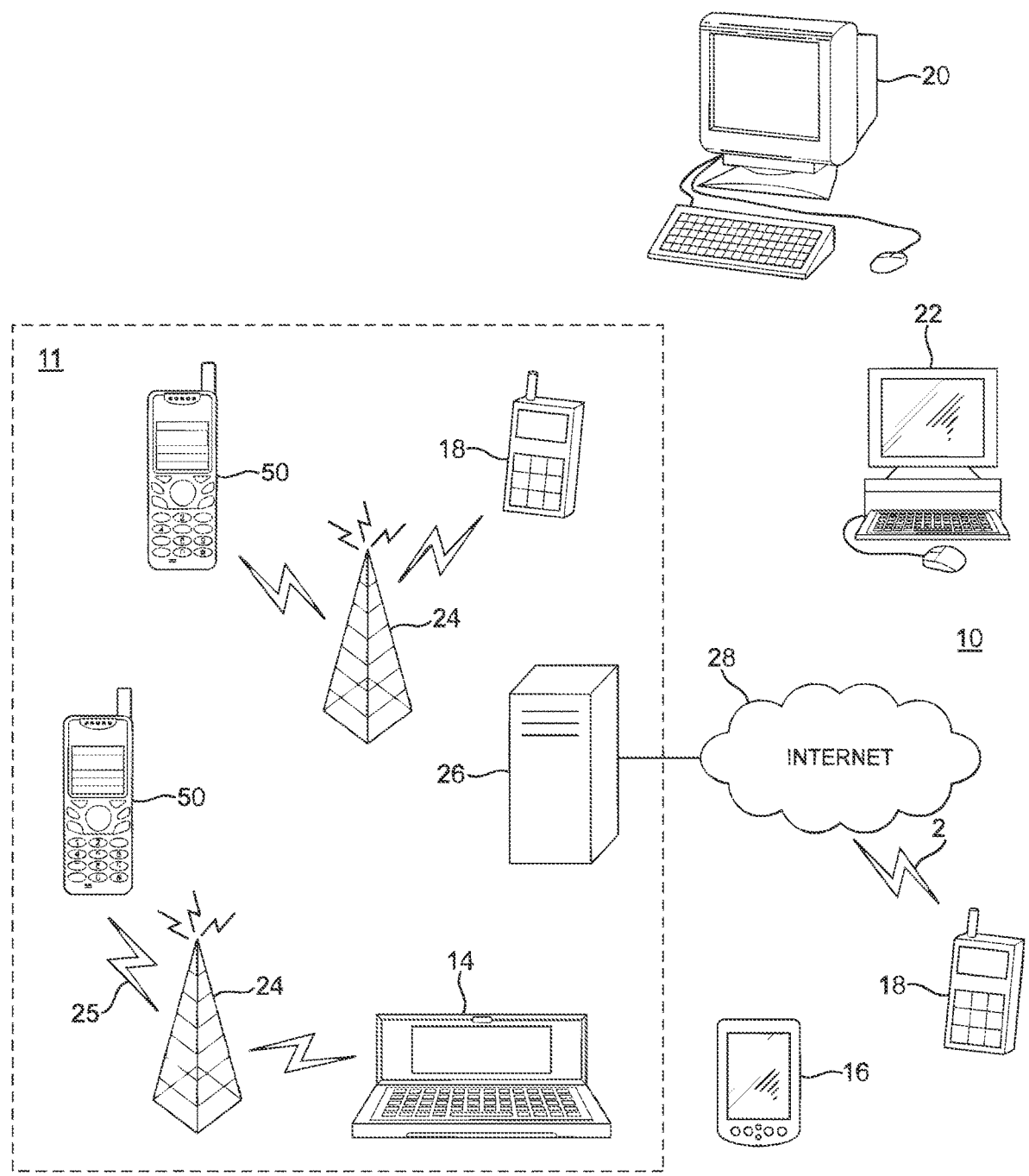
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Available media file format standards include ISO base media file format (ISO/IEC 14496-12, which may be abbreviated ISOBMFF) and file format for NAL unit structured video (ISO/IEC 14496-15), which derives from the ISOBMFF.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

The syntax of a box is as follows:

```
aligned(8) class Box (unsigned int(32) boxtype,
        optional unsigned int(8) [16] extended_type) {
    unsigned int(32) size;
    unsigned int(32) type = boxtype;
    if (size==1) {
        unsigned int(64) largesize;
    } else if (size==0) {
        // box extends to end of file
    }
    if (boxtype=='uuid') {
        unsigned int(8) [16] usertype = extended_type;
    }
}
```

In the above syntax, size is an integer that specifies the number of bytes in this box, including all its fields and contained boxes; if size is 1 then the actual size is in the field large size; if size is 0, then this box must be in a top-level container, and be the last box in that container (typically, a file or data object delivered over a protocol), and its contents extend to the end of that container (normally only used for a MediaDataBox). type identifies the box type; user extensions use an extended type, and in this case, the type field is set to 'uuid'.

Many formats are derived from ISOBMFF, including the High Efficiency Image File Format (HEIF, ISO/IEC 23008-12), MPEG-4 file format (ISO/IEC 14496-14, also known as the MP4 format), file format for NAL unit structured video (ISO/IEC 14496-15) and 3GPP file format (3GPP TS 26.244, also known as the 3GP format). These formats use the same box-structured basic structure.

According to the ISO base media file format, a file includes media data and metadata that are encapsulated into boxes. Each box is identified by a four character code (4CC) and starts with a header which informs about the type and size of the box.

Many files formatted according to the ISO base media file format start with a file type box, also referred to as FileTypeBox or the ftyp box. The ftyp box contains information of the brands labeling the file. The ftyp box includes one major brand indication and a list of compatible brands. The major brand identifies the most suitable file format specification to be used for parsing the file. The compatible brands indicate which file format specifications and/or conformance points the file conforms to. It is possible that a file is conformant to multiple specifications. All brands indicating compatibility to these specifications should be listed, so that a reader only understanding a subset of the compatible brands can get an indication that the file can be parsed. Compatible brands also give a permission for a file parser of a particular file format specification to process a file containing the same particular file format brand in the ftyp box. A file player may check if the ftyp box of a file comprises brands it supports, and may parse and play the file only if any file format specification supported by the file player is listed among the compatible brands.

In files conforming to the ISO base media file format, the media data may be provided in one or more instances of MediaDataBox ('mdat') and the MovieBox (moov) may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleTableBox (also known as the sample table or the sample table box). The SampleTableBox contains the SampleDescriptionBox, which gives detailed information about the coding type used, and any initialization information needed for that coding. The SampleDescriptionBox contains an entry-count and as many sample entries as the entry-count indicates. The format of sample entries is track-type specific but derive from generic classes (e.g. VisualSampleEntry, AudioSampleEntry). Which type of sample entry form is used for derivation the track-type specific sample entry format is determined by the media handler of the track.

Movie fragments may be used, for example, when recording content to ISO files, for example, in order to avoid losing data if a recording application crashes, runs out of memory space, or some other incident occurs. Without movie fragments, data loss may occur because the file format may require that all metadata, for example, a movie box, be written in one contiguous area of the file. Furthermore, when recording a file, there may not be sufficient amount of memory space to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification.

Transformed media tracks may have resulted by applying one or more transformations of different types for a conventional media track. A transformed media track may for example be an encrypted or protected media track or an incomplete media track. Incomplete tracks may result, for example, samples are received partially.

The ISO Base Media File Format contains three mechanisms for timed metadata that can be associated with particular samples: sample groups, timed metadata tracks, and sample auxiliary information. Derived specification may provide similar functionality with one or more of these three mechanisms.

Per-sample sample auxiliary information may be stored anywhere in the same file as the sample data itself; for self-contained media files, this is typically in a MediaDataBox or a box from a derived specification. It is stored either (a) in multiple chunks, with the number of samples per chunk, as well as the number of chunks, matching the chunking of the primary sample data or (b) in a single chunk for all the samples in a movie sample table (or a movie fragment). The Sample Auxiliary Information for all samples contained within a single chunk (or track run) is stored contiguously (similarly to sample data).

Sample Auxiliary Information, when present, is always stored in the same file as the samples to which it relates as they share the same data reference ('dref') structure. However, this data may be located anywhere within this file, using auxiliary information offsets ('saio') to indicate the location of the data.

Files conforming to the ISOBMFF may contain any non-timed objects, referred to as items, meta items, or metadata items, in a meta box (fourCC: 'meta'), which may also be called MetaBox. While the name of the meta box refers to metadata, items can generally contain metadata or media data. The meta box may reside at the top level of the file, within a movie box (fourCC: 'moov'), and within a track box (fourCC: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (fourCC: 'dinf'). In the specific case that the metadata is formatted using XML syntax and is required to be stored directly in the MetaBox, the metadata may be encapsulated into either the XMLBox (fourCC: 'xml') or the BinaryXMLBox (fourcc: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource; the resource can be formed by concatenating the extents.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, which may also be included in each track, may define an indexed list of uniform resource locators (URLs), uniform resource names (URNs), and/or self-references to the file containing the metadata. A sample entry may point to one index of the Data Reference box (which, in the syntax, may be referred to as DataReferenceBox), thereby indicating the file containing the samples of the respective chunk or track fragment.

DataReferenceBox contains a list of boxes that declare the potential location(s) of the media data referred to by the file. DataReferenceBox is contained by DataInformationBox, which in turn is contained by MediaInformationBox or MetaBox. When contained in the MediaInformationBox, each sample entry of the track contains a data reference index referring to a list entry of the list of box(es) in the DataReferenceBox. The box(es) in the DataReferenceBox are extended from FullBox, i.e. contain the version and the flags field in the box header. Two box types have been specified to be included in the DataReferenceBox: DataEntryUrlBox and DataEntryUrnBox provide a URL and URN data reference, respectively. When the least significant bit of the flags field of either DataEntryUrlBox or DataEntryUrnBox is equal 1 (which may be called the "self-containing" flag or self-contained flag), the respective data reference refers to the containing file itself and no URL or URN string is provided within the DataEntryUrlBox or the DataEntryUrnBox.

In ISOBMFF the exact location of samples referred to by a TrackBox (i.e. excluding samples referred to by movie fragments) may be computed using information provided by (a) DataReferenceBox (b) SampleToChunkBox (c) ChunkOffsetBox, and (d) SampleSizesBox. Furthermore, the locating of a sample involves an offset calculation using the start of the file. For sample referred to by movie fragments, the exact location of samples may be computed using information provided in TrackFragmentHeaderBox, and TrackFragmentRunBox, and the locating of a sample may involve an offset calculating using either the start of the file or the start of the MovieFragmentBox as a reference. The use of offsets may render the file fragile to any edits. For example, it may be sufficient to simply add or delete a byte between the start of a file and a MediaDataBox to destroy the computed offsets and render the file non-decodable. This means that any entity that is editing a file should be careful to ensure that all offsets computed and set in the file must be valid after it completes its editing.

The ItemLocationBox provides for each item, an indication if the item is located in this or other files and in the latter case the URN/URL of the other files, the base reference of byte offsets within the file, and the extents from which the item is constructed. For each extent, the ItemLocationBox is indicative of the byte offset relative to the base reference and the length of the extent. For each item the ItemLocationBox comprises data_reference_index, which is a 1-based index referring to a list entry of the list of box(es) in the DataReferenceBox contained in the MetaBox, and which identifies the file containing the item. For each item the ItemLocationBox also comprises the construction method field, which indicates the base reference within the file and can be one of the following:

file_offset: data_reference_index equal to 0 indicates the same file as the file containing the MetaBox. When the MetaBox is in a Movie Fragment and the data reference indicates 'same file', the data origin is the first byte of the enclosing MovieFragmentBox. Otherwise, byte offsets are absolute byte offsets into the file (from the start of the file) identified by data_reference_index.

idat_offset: byte offsets are relative to the ItemDataBox in the same MetaBox item_offset: byte offsets are relative to the start of an item data for an item indicated by the item_reference_index field.

Resource Interchange File Format (RIFF) files consist of chunks, which comprise a 4-character identifier of the chunk; an unsigned, little-endian 32-bit integer with the length of this chunk; the actual chunk data, of the size given in the previous field; and a possible pad byte, if the chunk's length is not even.

Chunks may contain sub-chunks, which are formatted identically to chunks. Many other formats are derived from RIFF, including WAV, AVI, and WebP.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

High Efficiency Image File Format (HEIF) is a standard developed by the Moving Picture Experts Group (MPEG) for storage of images and image sequences. Among other things, the standard facilitates file encapsulation of data coded according to High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with auxiliary image such as an alpha plane. A cover image among the collection of images is indicated using the 'pitm' box. A thumbnail image or an auxiliary image is linked to the primary image item using an item reference of type 'thmb' or 'auxl', respectively.

The ItemPropertiesBox enables the association of any item with an ordered set of item properties. Item properties are small data records. The ItemPropertiesBox consists of two parts: ItemPropertyContainerBox that contains an implicitly indexed list of item properties, and one or more ItemPropertyAssociationBox(es) that associate items with item properties. Item property is formatted as a box.

A descriptive item property may be defined as an item property that describes rather than transforms the associated item. A transformative item property may be defined as an item property that transforms the reconstructed representation of the image item content.

JPEG (Joint Photographic Experts Group) file format has been defined ISO/IEC 10918 standard series. A JPEG file consists of a sequence of segments, each segment beginning with a marker. Markers are used to identify the various structural parts of the JPEG file. Some markers are not followed by any data prior to the next marker. Other markers indicate that data associated with the marker follows; such segments may be categorized into marker segments and entropy-coded data segments.

All markers are two-byte codes: an X'FF' (i.e., a hexadecimal FF) byte followed by a byte which is not equal to 0 or X'FF' and indicates the type of the marker. Any marker may optionally be preceded by any number of fill bytes, which are bytes assigned code X'FF'. Marker segments contain a group of parameters related to that specific marker. When the marker is among those that indicate a marker segment, the first parameter in a marker segment is the two-byte length parameter. This length parameter encodes the number of bytes in the marker segment, including the length parameter and excluding the two-byte marker.

Entropy-coded data segments contain coded image data. Marker emulation is prevented in encoding of the entropy-coded data segments: any X'FF' byte generated by either a Huffman or arithmetic encoder, or an X'FF' byte generated by the padding of 1-bits at the end of compressed data to complete the final byte of a segment is followed by a "stuffed" zero byte. Decoders are configured to skip "stuffed" zero bytes. Byte stuffing is only applied to the entropy-coded data, not to marker payload data.

16 markers with marker value from X'FFE0' to X'FFEF', inclusive, are available for applications' use, also referred to as APP markers, or APPx or APPn markers (x or n indicating one of the 16 markers). Since several vendors might use the same APPn marker type, application-specific markers often begin with a standard or vendor name or some other identifying string, value, or bit pattern.

A Multipurpose Internet Mail Extension (MIME) is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can contain different media formats. Content type information may be included by a transmitting entity in a MIME header at the beginning of a media transmission. A receiving entity thus may need to examine the details of such media content to determine if the specific elements can be rendered given an available set of codecs. Especially when the end system has limited resources, or the connection to the end system has limited bandwidth, it may be helpful to know from the content type alone if the content can be rendered.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
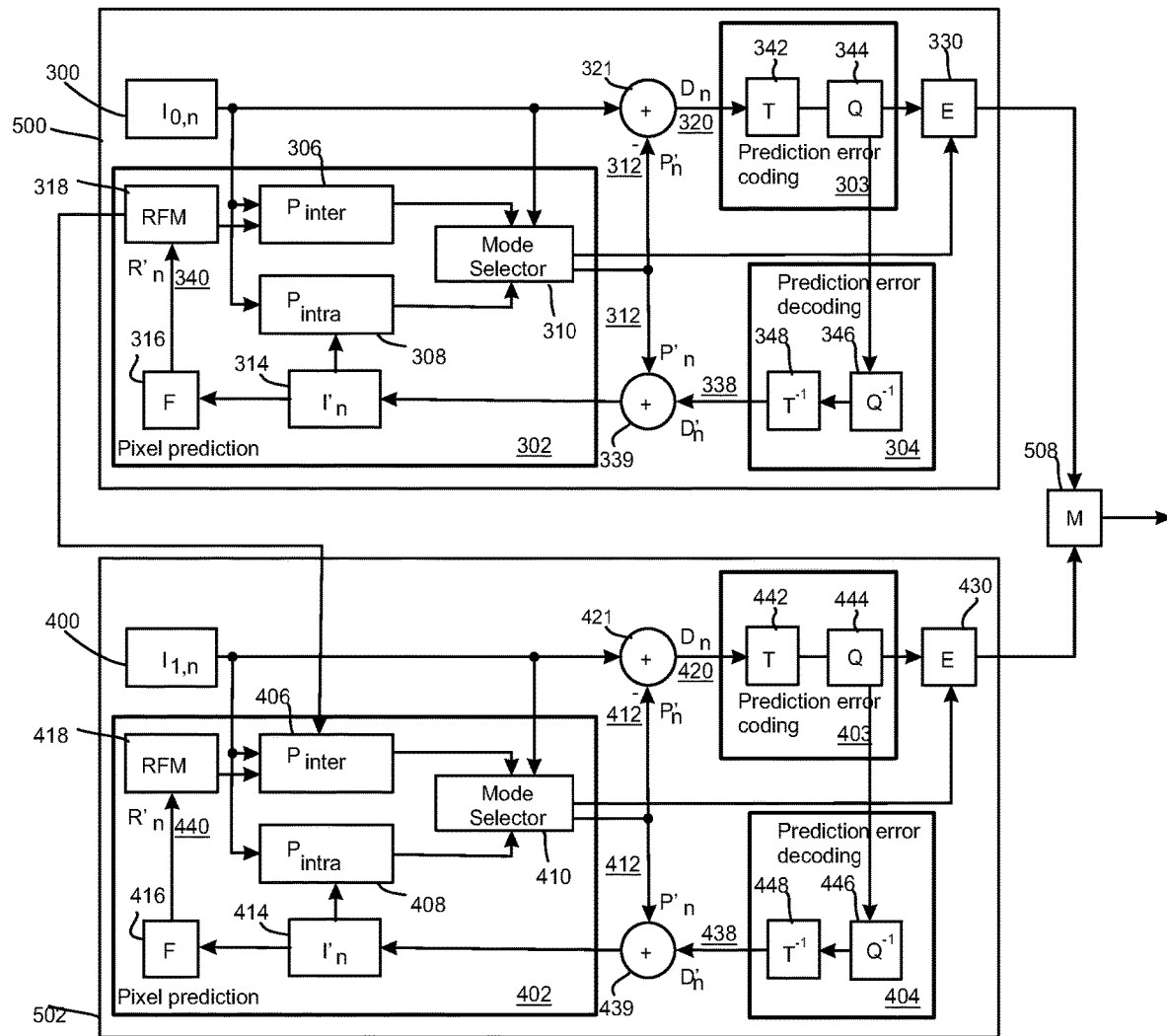
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension. An external base layer picture may be defined as a decoded picture that is provided by external means for the enhancement-layer decoding process and that is treated like a decoded base-layer picture for the enhancement layer decoding process. SHVC and MV-HEVC allow the use of external base layer pictures.

It should be understood that many of the scalability types may be combined and applied together.

The term layer may be used in context of any type of scalability, including view scalability and depth enhancements. An enhancement layer may refer to any type of an enhancement, such as SNR, spatial, multiview, and/or depth enhancement. A base layer may refer to any type of a base video sequence, such as a base view, a base layer for SNR/spatial scalability, or a texture base view for depth-enhanced video coding.

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching. Similarly to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the decoded picture buffer (DPB). An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team—Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

The standardization of the Versatile Video Coding (VVC, H.266, or H.266/VVC) standard has been started in the Joint Video Experts Team (JVET) of ITU-T and MPEG.

An elementary unit for the output of an H.264/AVC or HEVC encoder and the input of an H.264/AVC or HEVC decoder, respectively, is a Network Abstraction Layer (NAL) unit. The syntax of NAL units consists of a header and payload. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. An extractor sample may be defined as a sample that comprises one or more extractors.

The bytes of a resolved extractor are one of the following:
  a) One entire NAL unit; note that when an Aggregator is referenced, both the included and referenced bytes are copied
  b) More than one entire NAL unit In both cases the bytes of the resolved extractor start with a valid length field and a NAL unit header.

The bytes of a sample constructor are copied only from the single identified sample in the track referenced through the indicated 'scal' track reference. The alignment is on decoding time, i.e. using the time-to-sample table only, followed by a counted offset in sample number.

In some coding systems, such as HEVC, a picture can be partitioned into tiles, which are rectangular and contain an integer number of coding blocks. The partitioning to tiles may form a regular grid.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that parameters, such as motion vector candidates, are not derived from blocks outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

A tile track may be defined as a track that contains sequences of one or more motion-constrained tile sets of a coded bitstream. Decoding of a tile track without the other tile tracks of the bitstream may require a specialized decoder, which may be e.g. required to skip absent tiles in the decoding process. An HEVC tile track specified in ISO/IEC 14496-15 enables storage of one or more temporal motion-constrained tile set as a track. When a tile track contains tiles of an HEVC base layer, the sample entry type 'hvt1' is used. When a tile track contains tiles of a non-base layer, the sample entry type 'lht1' is used. A sample of a tile track consists of one or more complete tiles in one or more complete slice segments. A tile track is independent from any other tile track that includes VCL NAL units of the same layer as this tile track. A tile track has a 'tbas' track reference to a tile base track. The tile base track does not include VCL NAL units. A tile base track indicates the tile ordering using a 'sabt' track reference to the tile tracks. An HEVC coded picture corresponding to a sample in the tile base track can be reconstructed by collecting the coded data from the time-aligned samples of the tracks indicated by the 'sabt' track reference in the order of the track references. It can therefore be understood that a tile base track includes coded video data of the referenced tile tracks by reference.

The development of the image and video encoding standards provides incentives for introducing new media format which would be more efficiently compressed and more versatile usable. However, one drawback of introducing a new media format is the lack of device and playback support. Content creators and player developers wait until the new format adoption reaches a particular threshold. In such periods, it is extremely desirable to have a way to "design" the content in such a ways that it can be backwards compatible with the legacy players and formats as well as provide additional new features and experiences to the end users if their device supports the new media format. Hence, a smooth transition can happen and the media creation-consumption ecosystem of the new media format can develop in a healthy fashion.

For example, at present HEIF is not yet universally supported in all devices, operating systems, and image viewers, while legacy image viewers universally support JPEG files. To provide smooth transition from JPEG to HEIF in image file creation, the following approaches exist:
  Use HEIF in capturing or otherwise creating images. When a HEIF file is transferred outside a closed ecosystem, it is transcoded into a JPEG file. However, transcoding causes image quality degradation, consumes computing resources, and requires a closed ecosystem (e.g. no direct possibility to transfer files). Moreover, the content creator want to disallow the content from being transcoded or encapsulated into a new file format.
  Use both the legacy format (JPEG) and HEIF in capturing or otherwise creating images. In other words, whenever an image is captured or created, two files of the captured image, .jpg (i.e., a JPEG file) and .hif, (i.e., a HEIF file) are created. This approach is suboptimal in transferring the files, since the association of the files is created only by their file name and the files may accidentally get separated. Hence, it is difficult to manage the lifecycle of such content and any representation that make use of such content (e.g. HTML pages, CSS forms, etc.)

While many media formats use a file structure that is based on a sequence of sections that are type and length prefixed, they differ in details, such as the number of bytes for the type and length fields and the endianness of fields. Thus, file formats of different basic structure or definitions cannot be made conforming to each other. For example, a JPEG file cannot be made compliant with HEIF by just defining marker values and box types from the same value space.

A specific problem in carrying ISOBMFF-box-structured data within JPEG files is that JPEG marker segment length is indicated with a 16-bit codeword, whereas box length may be 32 or 64 bits. In other words, it might not be possible to encapsulate an ISOBMFF box within a JPEG marker segment.

Now an improved method for file authoring and related apparatus is introduced for alleviating the above problems.

The method according to an aspect, as shown in FIG. 5, comprises authoring (500) a first section of a first media format, wherein the first section comprises type and length fields of the first section, wherein the type value of the first section of the first media format is such that allows parsers of the first media format ignore the first section; one or more entire sections complying with a second media format; and a section header of a bridge section complying with the second media format, wherein the section header comprises type and length fields; authoring (502) a second section of the first media format, comprising type and length fields of the second section; and data complying with the second media format; and setting (504) the content of the first section to be such that it allows parsers of the second media format ignore the type and length fields of the second section.

The term "section" as used herein is defined as an atomic file structure unit with a type and a length. Examples of a section include a box (ISOBMFF), a segment (JPEG), and a chunk (RIFF). Sections are arranged contiguously in a file, i.e. by length field of a first section is indicative of the location of a next section in the file. The phrase "ignore" or "ignoring" e.g. a unit of data may be understood as skipping the unit of data without processing it during parsing or playback.

Hence, the method enables to use a new media format in media file capturing or creation in a manner that the created files can be consumed by legacy players that have no support for the new media format.

A bridge section may be defined to comply with the second media format and comprise the type value and the length field of the second section of the first media format in a manner that a parser of the second media format ignores the type value and the length field of the second section.

According to an embodiment, said setting of the content of the first section further comprising: setting the type value of the section header is such that allows parsers of the second media format ignore the bridge section; and setting the value of the length field of the section header of the bridge section to be such that the type and length fields of the second section of the first media format are enclosed in the bridge section.

According to an embodiment, the first media format is JPEG and the second media format is HEIF, the first section is a JPEG marker segment and the bridge section is a bridge box having a type allowing HEIF parsers ignore the bridge box.

Thus, the method for authoring a media file can be understood to be a method for authoring a JPEG file, comprising: authoring a first JPEG marker segment, wherein the first marker segment comprises:

type and length fields of the marker segment, wherein the type value of the first JPEG marker segment indicates an APP marker;
one or more entire boxes complying with HEIF;
a box header of a bridge box, wherein
the box header comprises type and length fields, and
the box type is such that allows HEIF parsers ignore the bridge box;
authoring a second JPEG marker segment, comprising:
type and length fields of the second JPEG marker segment;
data complying with HEIF; and
setting the value of the length field of the section header of the bridge section to be such that the type and length fields of the second JPEG marker segment are enclosed in the bridge box.

The type value of the second JPEG marker segment may indicate an APP marker.

In various syntax examples, the bridge box is referred to as BridgeJpegBox.

An example structure of a JPEG file containing a byte range complying with HEIF according to the embodiment is as follows:

```
// any segments allowed by JPEG may precede the following ones.
APPx marker { // the first JPEG marker segment
    ISOBMFF_magic_ID; // outside ISOBMFF-structured file
    FileTypeBox;
    MetaBox;
    BridgeJpegBox; // box header only
}
APPx marker {
    ISOBMFF_magic_ID; // contained by the previous BridgeJpegBox
    // data complying with HEIF,
    // e.g. one or more entire boxes, or
    // a MediaDataBox spanning over multiple contiguous APPx
    segments
    BridgeJpegBox;
}
// Zero or more APPx marker segments formatted as above.
APPx marker { // the last segment for the embedded
ISOBMFF-structure file
    ISOBMFF_magic_ID; // contained by the previous BridgeJpegBox
    // data complying with HEIF
}
// any segments allowed by JPEG may follow.
```

A single ISOBMFF magic ID value may be used for containing any data for the ISOBMFF compliant byte range, or multiple different identifier values may be defined depending on the carried content (e.g. one identifier for MediaDataBox and another for any other ISOBMFF file level boxes). The identifier value(s) may be for example URN string(s), such as "urn:mpeg:mpegH:heif:jpegAPP-Marker" or alike, UUID(s), or four-character code(s), such as 'isob', 'bmff', or 'heif'.

According to an embodiment, the syntax of a bridge box, here referred to as BridgeJpegBox, is specified as follows or in a similar manner. The syntax below uses APP9 segment in the BridgeJpegBox; however any other APP segment from APP0 to APP15 could likewise be used.

```
aligned(8) class BridgeJpegBox extends FullBox('brjp', 0, 0) {
    bit(8) jpeg_marker_byte = 0xFF;
    bit(8) jpeg_app_marker_byte = 0xE9;
    bit(16) jpeg_app_segment_length;
    string isobmff_urn;
}
``` jpeg_app_segment_length may be a valid APP segment length, as observed by a JPEG parser. isobmff_urn may be specified as a NULL-terminated UTF-8 string that has pre-defined value, such as a URN discussed above. Zero or more instances of BridgeJpegBox can be carried in the file level. Instances of BridgeJpegBox may be used when an ISOBMFF-structured file is embedded into a JPEG file. The contents of a BridgeJpegBox are irrelevant for parsing the embedded ISOBMFF-structured file. Instances of the box are not to be removed from an embedded ISOBMFF-structured file and are allowed to be removed from a standalone ISOBMFF-structured file. Care should be exercised when removing instances of the box, as this may invalidate offsets used to refer to other data. Parsers for ISOBMFF-structured files ignore (i.e., skip over) all instances of the BridgeJpegBox.

According to an embodiment, said setting of the content of the first section further comprises indicating in the type field of the bridge section that the bridge section contains media data; indicating in the length field of the bridge section that the bridge section encloses the type and length fields of the second section and at least a subset of the data complying with the second media format; and including only such data references in the one or more entire sections that avoid referencing the type and length fields of the second section.

An example structure of a JPEG file containing a byte range complying with HEIF according to this embodiment is as follows:

```
// any segments allowed by JPEG may precede the following ones.
APPx marker { // the first JPEG marker segment
    ISOBMFF_magic_ID;
    FileTypeBox;
    MetaBox;
    MediaDataBox;   // box header only, length e.g. until the end of
        // the next APP marker segment
}
APPx marker {
    ISOBMFF_magic_ID;
    // media data
}
```

Thus, the embodiment enables to use media data as the bridge section, wherein media data may be generically defined as the payload of MediaDataBox. The data references are set to be such that they do not reference the APPx marker or the ISOBMFF magic ID within the MediaDataBox. In other words, data references are set to be such that the APPx marker or the ISOBMFF magic ID are included neither in any sample of any track nor in any item.

File editors might rearrange samples and items contained in MediaDataBox(es) and remove any non-referenced bytes from the MediaDataBox(es). Hence, file editors could accidentally remove the APPx marker(es) and/or the ISOBMFF magic ID values from MediaDataBox(es). In an embodiment, ISOBMFF metadata is authored in manner that it contains references to the APPx marker(es) and/or the ISOBMFF magic ID values, hence avoiding their accidental removal in file editing. Mechanisms to realize such references include but are not limited to one or more of the following:

One or more items are created to contain the APPx marker(es) and/or the ISOBMFF_magic_ID values. A contiguous range of bytes can be included in a single extent and disjoint ranges of bytes can be included as separate extents into an item. The item may be indicated to be of a particular type, which indicates that it contains data used in JPEG encapsulation of the ISOBMFF compliant file.

Sample auxiliary information metadata is authored into the media file, and the APPx marker and the ISOBMFF_magic_ID are included in sample auxiliary information. This option may be particularly applicable, when a MediaDataBox embedded into the JPEG file contains samples of an image sequence track or a video track.

According to an embodiment, the method further comprises deriving an offset indicating a start position within the media file of the one or more entire sections complying with the second media format; and indicating the offset in association with the media file. This embodiment may be referred to as the offset feature.

Thus, the embodiment indicates the offset of the start position of data complying with the second media. When ISOBMFF-box-structured file is encapsulated within the media file of the first media format, the offset may be hereafter referred to as the ISOBMFF entry point.

Another aspect of the invention relates to the operation of a file parser upon receiving a media file authored according to the embodiments. The operation may be carried out as a method for parsing a media file complying with a first media format, as shown in FIG. 6, the method comprising receiving (600) an offset in association with the media file, the offset indicating a start position within the media file complying with a second media format; and parsing (602) the media file starting from the offset using a parsing process of the second media format.

Thus, if the first above-described example structure of a JPEG file is used as an example, a HEIF parser would parse the following boxes from the file, starting from the offset to the beginning of the FileTypeBox:

```
FileTypeBox;
MetaBox;
BridgeJpegBox {
    APPx marker {
        ISOBMFF_magic_ID;
    }
}
// data complying with HEIF,
// e.g. one or more entire boxes, or
// a MediaDataBox spanning over multiple contiguous APPx segments
```

Similarly, if the example syntax of the BridgeJpegBox is in use and if the second and later segments for containing HEIF data contain MediaDataBoxes, a HEIF parser would parse the following boxes from the file, starting from the offset to the beginning of the FileTypeBox:

```
FileTypeBox;
MetaBox;
BridgeJpegBox {
    jpeg_marker_byte;
    jpeg_app_marker_byte;
    jpeg_app_segment_length;
    isobmff_urn
}
MediaDataBox;
... // Zero or more pairs of BridgeJpegBox and MediaDataBox as above
// Last pair of BridgeJpegBox and MediaDataBox
BridgeJpegBox {
    jpeg_marker_byte;
    jpeg_app_marker_byte;
```

```
    jpeg_app_segment_length;
    isobmff_urn
}
MediaDataBox;
```

Using the second above-described example structure of a JPEG file, a HEIF parser would parse the following boxes from the file, starting from the offset to the beginning of the

```
            FileTypeBox:
            FileTypeBox;
            MetaBox;
            MediaDataBox {
                APPx marker
                ISOBMFF_magic_ID;
                // media data
            }
```

The embodiments as described herein may facilitate to achieve significant advantages. For example, files according to the embodiments are compatible with a legacy format, such as JPEG, and hence play universally in all devices and in all players/viewers. Moreover, the file parsing of a new media format, such as HEIF, is kept unchanged except that the parsing is started from the signalled or indicated byte offset.

The embodiments may facilitate for example the following use cases:

Creating a single JPEG file that contains a medium resolution (e.g. 1 . . . 4 megapixels) image coded with JPEG and a high resolution (e.g. 10 . . . 30 megapixels) image coded with HEVC. The file can be displayed with legacy JPEG image viewers and with HEIF image viewers that support the offset feature.

Creating a single JPEG file that contains a medium resolution (e.g. 1 . . . 4 megapixels) image coded with JPEG and a high resolution (e.g. 10 . . . 30 megapixels) image coded with SHVC, using the JPEG image as the external base layer. The file can be displayed with legacy JPEG image viewers and with HEIF image viewers that support the offset feature and SHVC decoding. Compared to storing multiple independent coded versions of the same original image, this option saves storage space.

Creating a JPEG file that contains a JPEG-coded 360° image and OMAF (MPEG Omnidirectional MediA Format) image metadata describing the 360° image. The file can be displayed with legacy JPEG image viewers but such displaying may be suboptimal (e.g. displaying an equirectangular panorama or a cubemap image as a 2D image). An OMAF-capable HEIF parser may display the image in a manner desired by the content author, e.g. obeying the initial viewing orientation item property, which indicates the initial viewing orientation (comprising azimuth, elevation and/or tilt values) according to which the associated image should be initially rendered to the user. A JPEG coded image item can be created in the HEIF metadata by letting the DataReferenceBox to refer to the containing JPEG image (its start of image marker, i.e. SOI marker) as defined in HEIF.

Creating a JPEG file that contains an image coded with JPEG and a HEIF encapsulated image sequence or image collection accompanying the JPEG image. Legacy JPEG viewers will only display the JPEG image and advanced players would have the option to playback the accompanying image sequence or image collection.

As a further advantage, a single file may be used in containing coded images of different coding formats and different basic file structures. File management is simple, since the different versions do not get separated.

Some further embodiments relating to the authoring the media file are described below.

MIME Type Parameter

According to an embodiment, a MIME (Multipurpose Internet Mail Extensions) parameter is defined for carriage of the offset indicating the start position within the media file of the one or more entire sections complying with the second media format.

For example, the following MIME parameter may be defined for ISOBMFF-box-structured data.

isobmffentrypoint: byte offset from the start of the file to the start of the box-structured data The MIME parameter may additionally contain additional data related to the byte range complying with the second media format. For example, isobmffentrypoint may be specified to contain the following: optionally a comma-separated byte count of box-structured data. The byte range that conforms to ISOBMFF may be identified in a straightforward manner by a parser when the byte count of the box-structured data is given. It may be defined that in the absence of providing such byte count, the byte range spans until the end of the file.

Instead of the byte count of box-structure data, other means to indicate the end of box-structured data may be indicated. For example the byte offset from the start of the file to the end of the box-structure data may be provided in its own MIME parameter or included e.g. as a comma-separated value within the value string of isobmffentrypoint.

In an embodiment, compatible brands of the embedded ISOBMFF-structured file are provided in a MIME parameter. For example, the isobmffentrypoint may optionally end with a comma-separated list of compatible brands of the FileTypeBox. In another example, an optional MIME parameter, e.g. called isobmffprofiles, includes a comma-separated list of compatible brands of the FileTypeBox. The brands enable a parser to conclude which ISOBMFF brands the file complies with prior to downloading or parsing the file.

In an embodiment, sample entry type(s) of track(s) of the embedded ISOBMFF-structured file are provided in a MIME parameter. For example, an optional MIME parameter, e.g. called isobmffcodecs, includes the sample entry type(s) formatted identically to the codecs parameter of self-standing ISOBMFF files.

In an embodiment, item types of item(s) of the embedded ISOBMFF-structured file are provided in a MIME parameter. For example, an optional MIME parameter, e.g. called isobmffitemtypes, includes the item type(s) formatted identically to the itemtypes parameter of self-standing ISOBMFF files.

ISOBMFF Data References Relative to the ISOBMFF Entry Point

According to an embodiment, absolute file offsets derived from the ISOBMFF boxes are specified to be relative to the ISOBMFF entry point.

ISOBMFF parser needs to handle file offsets relative to ISOBMFF entry point. Alternatively, the ISOBMFF compliant byte range needs to be extracted into its own file prior to providing it to the ISOBMFF parser.

Since the ISOBMFF uses unsigned integers for providing file-based offsets, the coded media data of the first media format, such as the coded JPEG image of the containing JPEG file, cannot be referenced by the encapsulated ISOBMFF compliant byte range when self-contained data referencing is in use (e.g. the self-contained flag set in a data entry box within the DataReferenceBox). In an embodiment, this restriction is overcome by using a URL as the basis for the data reference, i.e. the URL of the containing file itself. In other words, when a reference to the JPEG-coded image is made, a data reference to DataEntryUrlBox indicating the JPEG file itself is used (i.e. a URL of type file://heif_in_jpeg.jpg). For avoiding such URL causing an infinite loop in parsing, it may be indicated within the URL that it is to be parsed only once, e.g. with the following type of a URL including a specific query string: "http://... heif in jpeg.jpg?runonce=true". In another embodiment, a box header flag for the boxes contained by the DataReferenceBox is specified for indicating that the base reference for offsets is the start of the containing file (e.g. the containing JPEG file).

ISOBMFF Data References Relative to the Start of the Containing File

According to an embodiment, absolute file offsets derived from the ISOBMFF boxes are specified to be relative to the start of the containing file. For example, when an ISOBMFF-compliant byte range is contained in a JPEG file, the ISOBMFF data references are relative to the start of the JPEG file. This design may be vulnerable to file editing, since the ISOBMFF-compliant byte range remains valid only if the respective ISOBMFF entry point does not change in editing.

Use of IdentifiedMediaDataBox

The draft amendment 2 of ISOBMFF specifies box-relative addressing as an alternative to offset addressing. Some features of ISOBMFF draft amendment 2 are described below.

An identified media data box may have the same semantics as a MediaDataBox has but it additionally contains an identifier that is used in setting up data references to the contained media data. The identifier may for example be the first element contained by the identified media data box. The syntax of an identified media data box may be specified as follows, where imda_identifier is the identifier of the box. It is noted that while imda_identifier of type 32-bit unsigned integer is used in the syntax, other field lengths and other basic data types (e.g. string) are similarly possible.

```
aligned(8) class IdentifiedMediaDataBox extends Box('imda') {
    unsigned int(32) imda_identifier;
    bit(8) data[ ]; // until the end of the box
}
```

A box, here referred to as DataEntryImdaBox, may be used for referencing data in an identified media data box. The DataEntryImdaBox identifies the IdentifiedMediaDataBox containing the media data accessed through the data_reference_index corresponding to this DataEntryImdaBox. The DataEntryImdaBox contains the value of imda_identifier of the referred IdentifiedMediaDataBox. The media data offsets are relative to the first byte of the payload of the referred IdentifiedMediaDataBox. In other words, media data offset 0 points to the first byte of the payload of the referred IdentifiedMediaDataBox. A sample entry contains data_reference_index that identifies which data reference of the DataReferenceBox is in use for containing the samples referencing the sample entry. When an IdentifiedMediaDataBox is used in containing samples, the data_reference_index is set a value pointing to a DataEntryImdaBox. The syntax of DataEntryImdaBox may be specified as follows, where imda_ref_identifier provides an imda_identifier value and thus identifies a particular IdentifiedMediaDataBox.

```
aligned(8) class DataEntryImdaBox (bit(24) flags)
    extends FullBox('imdt', version = 0, flags) {
    unsigned int(64) imda_ref_identifier;
}
```

File requirements for 'relo' brand, specified in the ISOBMFF draft amendment 2, may be specified as follows. Files having the 'relo' brand among compatible_brands of FileTypeBox are required to be constrained as follows: When construction_method equal to 0 (file_offset) is in use for an item in ItemLocationBox, data_reference_index for the item is required to point to a DataEntryImdaBox. Each data_reference_index value in the sample entries of all tracks are required to point to DataEntryImdaBox.

A file having the 'relo' brand may be required to be accompanied by a BoxFileIndexBox that indexes the file and is provided separately from the file, for example using the fileindex MIME parameter with the file. The BoxFileIndexBox is required to contain FrontPartBox including imda_identifier for each IdentifiedMediaDataBox. Rather than traversing the top-level boxes of the file, parsers can use the BoxFileIndexBox to conclude the byte locations of each IdentifiedMediaDataBox referred to by the DataReferenceBox(es).

ISO/IEC 23001-14 specifies the Partial File Format, which is a generic format for describing file partially received over lossy communication channels. The partial file format may be used to document reception of files, regardless of their bitstream format. For generic cases, it provides ways for file readers to resynchronize their parsing in case of byte losses. For cases where the documented file derives from ISO/IEC 14496-12, the partial file format provides additional tools, such as an index of the source file structures and data integrity information. ISO/IEC 23001-14 also specifies the MIME type for the Partial File Format.

The Partial File Format includes the specification of BoxFileIndexBox, which provides a summary of the box hierarchy of a box-structured file. It contains a set of BoxIndexBox boxes, each of which describes one top-level box. Each top-level box of the source file will typically have zero or one associated BoxIndexBoxes in the BoxFileIndexBox. A FrontPartBox can be contained in a BoxIndexBox. The FrontPartBox provides a selected number of initial bytes of the content of the box identified by the containing BoxIndexBox. The fileindex MIME parameter contains one base-64 encoded BoxFileIndexBox, including the box header and contents and containing at least one BoxIndexBox. The fileindex parameter may be used with any box-structured file (e.g. ISOBMFF or HEIF file).

File reader for 'relo' brand may be specified as follows. When a data reference refers to an IdentifiedMediaDataBox of the containing file but no IdentifiedMediaDataBox with imda_identifier equal to the imda_ref_identifier given in the data reference is present in the file, readers may be required to omit the processing of the associated track or item. Furthermore, readers may be required to omit the processing of any tracks or items depending on such an associated track or item, for example through a track reference or an item reference.

Another option for implementing embodiments is to use the IdentifiedMediaDataBox(es) and the 'relo' brand as specified in ISOBMFF draft amendment 2 as described in the following. In this option no absolute data offsets are provided but the containing media data boxes are identified through their identifier. In an embodiment, at least a part of coded media data of the second media format in included in an identified media data box (e.g. IdentifiedMediaDataBox of ISOBMFF). Data references are created in the file to identify which identified media data box contains the referenced media data; for example, DataEntryImdaBox may be used as described above.

The following example shows a potential file structure for an embodiment using IdentifiedMediaDataBox.

```
// any segments allowed by JPEG may precede the following ones.
APPx marker { // the first JPEG marker segment
    ISOBMFF_magic_ID;
    FileTypeBox;
    MetaBox;
    IdentifiedMediaDataBox
        // box length spanning over to the next APP segment
        imda_identifier;
        // no other content of IdentifiedMediaDataBox payload
}
APPx marker {
    ISOBMFF_magic_ID;
    // media data
}
```

A BoxFileIndexBox as specified in ISO/IEC 23001-14 may be carried within an APP segment or carried in the fileindex MIME parameter in order to comply with the 'relo' brand. The BoxFileIndexBox only documents the box-structured file carried in the APP segments.

While this approach cannot cope with re-arranging the APP segments carrying ISOBMFF data, it may generally be more robust than the above-described file offset based solutions.

Large ISOBMFF Boxes Contained in JPEG File

Any file where all file-level boxes are less than 65534 bytes can be piggy-backed in JPEG marker segments as described in above embodiments. Consequently, e.g. File-TypeBox and MetaBox can typically be carried without problems. A large MovieBox can be fragmented to several MovieFragmentBoxes. However, coded frames beyond 65534 bytes need special handling. For image items, large coded frames need to be split into multiple APP segments, and the data in each APP segment needs to be referenced by an extent. For tracks, there is no generic solution (no generic mechanism like extents). AVC or HEVC frames can be split to several incomplete video tracks e.g. on NAL unit basis (slices) and extractor tracks can be used to reassemble the bitstream. An alternative for HEVC bitstreams with tiles is to use tile tracks for carrying NAL units and tile base tracks to reassemble the bitstream.

Interface for Providing the Offset and an ISOBMFF Brand

In an embodiment, a file parsing or reading process has an interface to convey an offset indicating a start position within the media file of a byte range complying with media format of supported by the parsing/reading. For example, a parser conforming to the ISOBMFF and/or its derivative may have an interface for inputting the ISOBMFF entry point.

An ISOBMFF brand, such as 'adfr' (additionally framed), may be specified. A parser or reader conforming to the brand is required to have and support the interface for inputting the ISOBMFF entry point.

Figure 7:
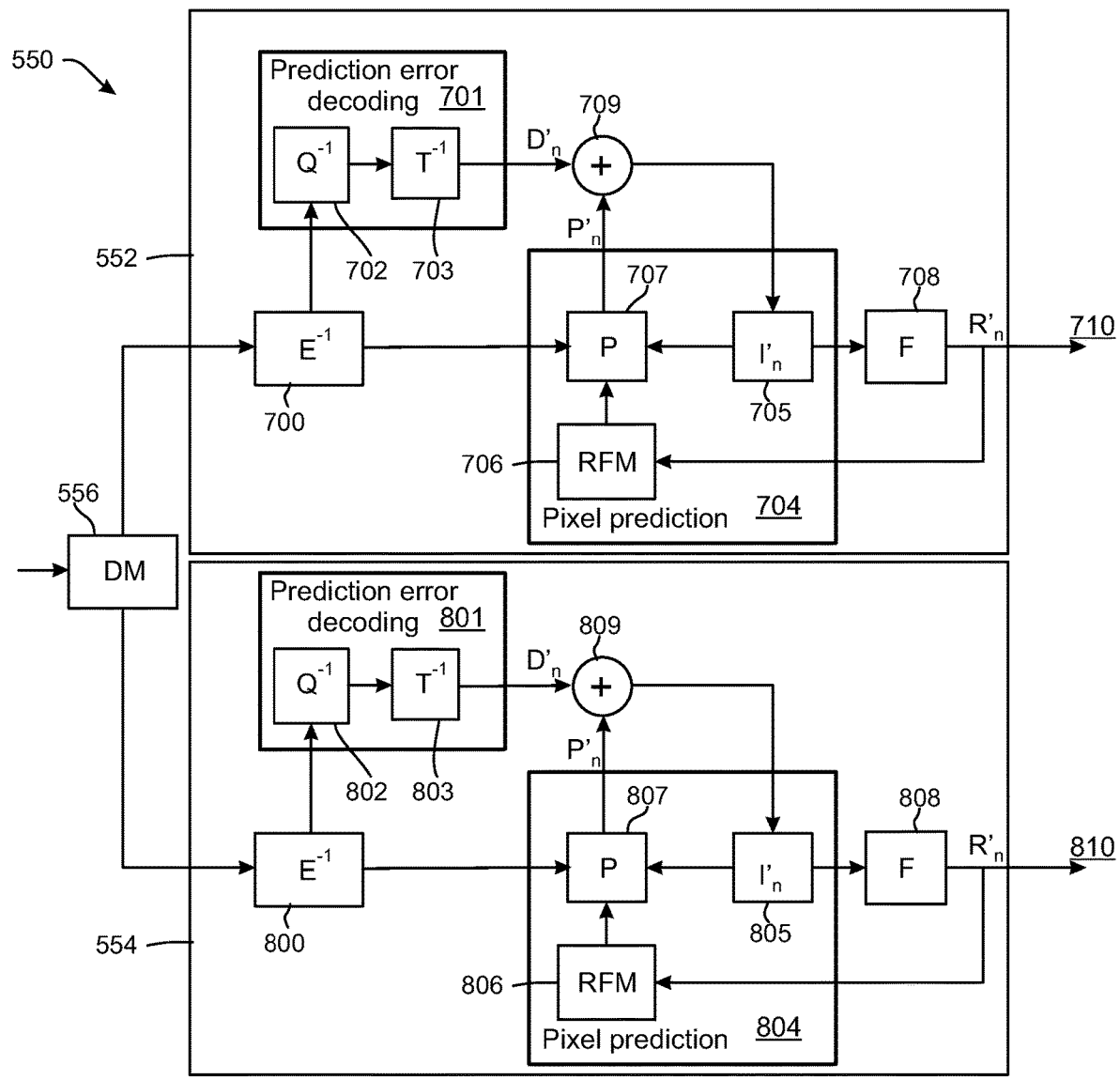
FIG. 7 shows a schematic diagram of a decoder suitable for implementing embodiments of the invention.

FIG. 7 shows a block diagram of a video decoder suitable for employing embodiments of the invention. FIG. 7 depicts a structure of a two-layer decoder, but it would be appreciated that the decoding operations may similarly be employed in a single-layer decoder.

The video decoder 550 comprises a first decoder section 552 for a base layer and a second decoder section 554 a predicted layer. Block 556 illustrates a demultiplexer for delivering information regarding base layer pictures to the first decoder section 552 and for delivering information regarding predicted layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base layer/predicted layer images to obtain the preliminary reconstructed images (I'n). Preliminary reconstructed and filtered base layer images may be output 709 from the first decoder section 552 and preliminary reconstructed and filtered base layer images may be output 809 from the first decoder section 554.

Herein, the decoder should be interpreted to cover any operational unit capable to carry out the decoding operations, such as a player, a receiver, a gateway, a demultiplexer and/or a decoder.

Figure 8:
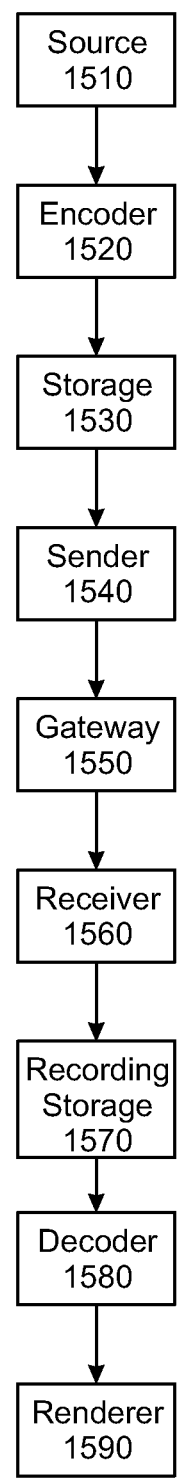
FIG. 8 shows a schematic diagram of an example multimedia communication system within which various embodiments may be implemented.

FIG. 8 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multitasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC. It needs to be understood that embodiments may be similarly realized with any video encoder and/or video decoder with respective terms of other codecs. For example, rather than tiles or tile sets, embodiments could be realized with rectangular slice groups of H.264/AVC.

In the above, some embodiments have been described in relation to containing a HEIF or ISOBMFF file within a JPEG file. It needs to be understood that embodiments could be similarly realized with any file formats, such as RIFF-based formats and/or Matroska, with similar capability and/or structures as those in HEIF, ISOBMFF and JPEG.

In the above, where the example embodiments have been described with reference to a file generator or file writer, it needs to be understood that the resulting file and a file parser may have corresponding elements in them. Likewise, where the example embodiments have been described with reference to a file parser, it needs to be understood that the file writer may have structure and/or computer program for generating the file to be parsed by the file parser.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
   authoring a first section of a first media format, wherein the first section comprises: type and length fields of the first section, wherein a type value of the first section of the first media format is such that the type value allows parsers of the first media format to ignore the first section;
   at least one entire section complying with a second media format, and a section header of a bridge section complying with the second media format, wherein the section header comprises the type and length fields;
   authoring a second section of the first media format, comprising type and length fields of the second section; and data complying with the second media format; and
   setting content of the first section to be such that the content allows parsers of the second media format to ignore the type and length fields of the second section, wherein said setting of the content of the first section further comprises:
   indicating in the type field of the bridge section that the bridge section comprises media data;
   indicating in the length field of the bridge section that the bridge section encloses the type and length fields of the second section and at least a subset of the media data complying with the second media format; and
   including data references in the at least one entire section that avoid referencing the type and length fields of the second section.

2. The method according to claim 1, wherein said setting of the content of the first section further comprises:
   setting the type value of the section header such that the type value allows parsers of the second media format ignore the bridge section; and
   setting a value of a length field of the section header of the bridge section to be such that the type and length fields of the second section of the first media format are enclosed in the bridge section.

3. The method according to claim 1, wherein the first media format comprises a joint photographic experts group format and the second media format comprises a high efficiency image file format, and wherein the first section comprises a joint photographic experts group marker segment and the bridge section is a bridge box comprising a type allowing high efficiency image file format parsers to ignore the bridge box.

4. The method according to claim 1, further comprising:
   indicating, in a media file, a data reference to a media frame according to the second media format to be one of the following:
   a first byte offset relative to a start position within the media file of the at least one entire section complying with the second media format;
   a second byte offset relative to a resource identified by a universal resource locator, the universal resource locator identifying the media file;
   a third byte offset relative to the start of the media file; or
   a fourth byte offset relative to an identified media data container with an indicated first identifier value.

5. The method according claim 1, further comprising: deriving an offset indicating a start position within the media file of the at least one entire section complying with the second media format; and indicating the offset in association with the media file.

6. The method according to claim 2, wherein the first media format comprises a joint photographic experts group format and the second media format comprises a high efficiency image file format, and wherein the first section comprises a joint photographic experts group marker segment and the bridge section is a bridge box comprising a type allowing high efficiency image file format parsers to ignore the bridge box.

7. The method according to claim 2, further comprising: deriving an offset indicating a start position within the media file of the at least one entire section complying with the second media format; and indicating the offset in association with the media file.

8. The method according to claim 3, further comprising: deriving an offset indicating a start position within the media file of the at least one entire section complying with the second media format; and indicating the offset in association with the media file.

9. The method according to claim 1, further comprising: deriving an offset indicating a start position within the media file of the at least one entire section complying with the second media format; and indicating the offset in association with the media file.

10. The method according to claim 4, further comprising:
    deriving an offset indicating a start position within the media file of the at least one entire section complying with the second media format; and
    indicating the offset in association with the media file.

11. An apparatus comprising:
    at least one processor, and
    at least one non-transitory memory including computer program code for at least one or more programs, the at least one non-transitory memory and the computer program code configured to, with the at least one processor, cause the apparatus at least to:
    author a first section of a first media format, wherein the first section comprises type and length fields of the first section, wherein a type value of the first section of the first media format is such that the type value allows parsers of the first media format to ignore the first section;
    at least one entire section complying with a second media format; and
    a section header of a bridge section complying with the second media format, wherein the section header comprises the type and length fields;

author a second section of the first media format, comprising type and length fields of the second section, and data complying with the second media format; and set content of the first section to be such that the content allows parsers of the second media format to ignore the type and length fields of the second section, wherein the setting content of the first section comprises indicating in the type field of the bridge section that the bridge section contains media data; indicate in the length field of the bridge section that the bridge section encloses the type and length fields of the second section and at least a subset of the data complying with the second media format, and comprise only such data references in the at least one entire section that avoid referencing the type and length fields of the second section.

12. The apparatus according to claim 11, wherein to set the content of the first section, the at least one non-transitory memory and the computer program code are further configured to, with the at least one processor, cause the apparatus to at least:

set the type value of the section header is such that allows parsers of the second media format ignore the bridge section; and set the value of the length field of the section header of the bridge section to be such that the type and length fields of the second section of the first media format are enclosed in the bridge section.

13. The apparatus according to claim 11, wherein the first media format is joint photographic experts group and the second media format is high efficiency image file format, the first section is a joint photographic experts group marker segment and the bridge section is a bridge box having a type allowing high efficiency image file format parsers ignore the bridge box.

14. The apparatus according to claim 11, wherein the at least one non transitory memory and the computer program code are configured to, with the at least one processor, cause the apparatus to at least:

indicate, in a media file, a data reference to a media frame according to the second media format to be one of the following:

a first byte offset relative to a start position within the media file of the at least one entire section complying with the second media format;

a second byte offset relative to a resource identified by a universal resource locator, the universal resource locator identifying the media file;

a third byte offset relative to the start of the media file; or a fourth byte offset relative to an identified media data container with an indicated first identifier value.

15. The apparatus according to claim 11, wherein the at least one non-transitory memory and the computer program code are configured to, with the at least one processor, cause the apparatus to at least:

derive an offset indicating a start position within the media file of the at least one entire section complying with the second media format; and indicate the offset in association with the media file.

16. The apparatus according to claim 12, wherein the first media format is joint photographic experts group and the second media format is high efficiency image file format, the first section is a joint photographic experts group marker segment and the bridge section is a bridge box having a type allowing high efficiency image file format parsers ignore the bridge box.

* * * * *